United States Patent [19]

Duncan

[11] Patent Number: 4,883,398

[45] Date of Patent: Nov. 28, 1989

[54] TOGGLE BOLT INSTALLATION, HARDWARE, AND MANUFACTURE

[75] Inventor: Edward H. Duncan, Avonmore, Pa.

[73] Assignee: Daniel A. Sullivan, Jr., New Kensington, Pa.; a part interest

[21] Appl. No.: 60,327

[22] Filed: Jun. 10, 1987

[51] Int. Cl.$^4$ ............................................. F16B 21/00
[52] U.S. Cl. .................................. 411/344; 411/531; 411/547; 10/86 B
[58] Field of Search .................................. 411/340–346, 411/531, 547, 8, 2, 908, 39; 10/86 B; 29/426.4, 526 R, 525.1

[56] References Cited

U.S. PATENT DOCUMENTS

| | | | |
|---|---|---|---|
| D. 23,551 | 8/1894 | Park | 411/531 X |
| 687,809 | 12/1901 | Wrigley | 411/346 |
| 1,108,922 | 9/1914 | Menten | 411/346 |
| 1,493,197 | 5/1924 | Hall | 411/340 |
| 2,061,634 | 11/1936 | Pleister | 411/342 |
| 2,285,273 | 6/1942 | Hall et al. | 411/918 X |
| 2,352,118 | 6/1944 | Poupitch | 10/86 B X |
| 2,616,327 | 11/1952 | Karitzky | 411/346 |
| 3,513,746 | 5/1970 | Forsberg | 411/346 |
| 3,929,311 | 12/1975 | Solo | 411/908 X |
| 4,114,218 | 9/1978 | Pendell | 10/86 B X |
| 4,164,164 | 8/1979 | Trungold | 411/10 |
| 4,303,001 | 12/1981 | Trungold | 411/531 X |
| 4,453,869 | 6/1984 | Cremieux | 411/344 X |
| 4,541,761 | 9/1985 | Bryce, Jr. | 411/34 |

OTHER PUBLICATIONS

Am. J. of Roentgenology, vol. XXII, No. 1, p. 45.
G.R.C., "Die Cast Industrial Fasteners".

*Primary Examiner*—Gary L. Smith
*Assistant Examiner*—Flemming Saether

[57] ABSTRACT

In an installation method according to the invention, one pulls the wings of a toggle bolt into contact with the inner surface of a wall continuously during tightening of the bolt, this being in contrast with previous practice where the finger nails eventually must be removed, and thus the pulling action eliminated, in order to prevent locking of the fingernails between the wall and bolt head. An apparatus according to the invention comprises means for exerting a pull on the bolt of a toggle bolt, for maintaining the contact of the wings with the inner surface of a wall until the bolt has been tightened. The invention also provides a special manufacturing method for a particular apparatus of the invention.

1 Claim, 2 Drawing Sheets

TOGGLE BOLT INSTALLATION, HARDWARE, AND MANUFACTURE

DESCRIPTION

Technical Field

The invention relates generally to the subject of toggle bolts—installation, hardware, and manufacture.

Background—Introduction

This introduction is adapted from U.S. Pat. No. 2,061,634.

In practice, installation of a toggle bolt requires considerable dexterity, even luck.

It is necessary to prevent the toggle wings from rotating on the concealed surface of the wall, as the bolt is screwed into it. While the bolt is being screwed home, the carpenter has to also hold the work in position, so that it will be true when the toggle wings are brought up firmly on the inside or concealed surface of the wall or other support.

To prevent the rotation of the toggle head, it is customary for the carpenter to draw back on the head of the bolt to exert frictional pressure or resistance between the toggle head and the inner surface of the wall. This friction must be greater than the friction between the threads on the bolt and the threads in the trunnion nut, as the bolt is screwed home.

When the head of the bolt is up close to the work to be supported, it is often necessary for the carpenter to get a very close hold of the head of the bolt, often by employing his finger nails, to their damage. At the same time, he has to hold the work in position and screw up the bolt. Therefore, it can be readily seen that it requires considerable skill and patience to position a simple toggle bolt.

Background—Others' Solutions

U.S. Pat. No. 2,061,634 extends toggle-wing-biasing spring arms to engage the concealed surface of the wall before the toggle wings do, this acting to prevent toggle wing rotation during the later stages of bolt tightening.

U.S. Pat. No. 4,502,826 uses a guide blade to prevent nut rotation in a toggle fastener.

U.S. Pat. No. 4,616,968 provides an extra spring with a compressible loop which stays in the hole through the wall, interferring with walls of the hole, in order to prevent rotation of the toggle wings during tightening of the bolt.

DISCLOSURE OF INVENTION

It is an object of the invention to provide a novel means of preventing toggle wing rotation during bolt tightening.

This and other objects which will become apparent in the discussion that follows are achieved according to the present invention by both method and apparatus aspects. In an installation method according to the invention, one pulls the wings of a toggle bolt into contact with the inner surface of a wall continuously during tightening of the bolt, this being in contrast with previous practice where the finger nails eventually must be removed, and thus the pulling action eliminated, in order to prevent locking of the fingernails between the wall and bolt head. An apparatus according to the invention comprises means for exerting a pull on the bolt of a toggle bolt, for maintaining the contact of the wings with the inner surface of a wall until the bolt has been tightened. The invention also provides a special manufacturing method for a particular apparatus of the invention.

MODES OF CARRYING OUT THE INVENTION

Figure 1:
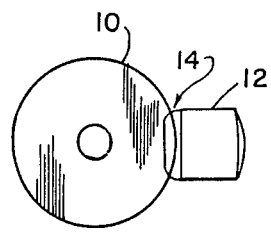
FIGS. 1 and 2 are, respectively, top and side views of an apparatus of the invention.
Figure 2:
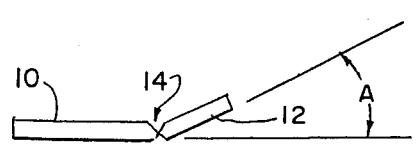

A tabbed washer, forming one example of an apparatus of the invention, a means for exerting a pull on the bolt of a toggle bolt, is illustrated in FIGS. 1 and 2. The washer 10 is joined to a tab 12. The tab is inclined from the plane of the washer by an angle A. The region 14, where the washer joins the tab, is of reduced cross section, such that tab 12 can be broken from the washer by bending with pliers. The reduced cross section must not be made so weak that breaking would be caused by exertion of the pulling action described below.

Figure 3:
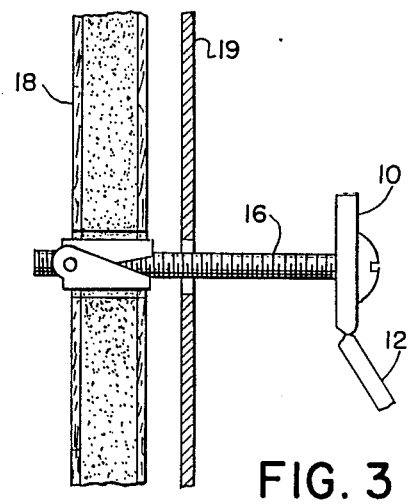
FIGS. 3 to 6 are cross sectional, side views of different stages in execution of an installation method of the invention.
Figure 4:
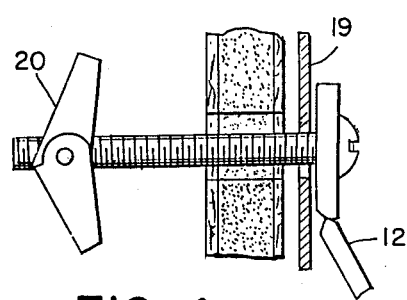
Figure 5:
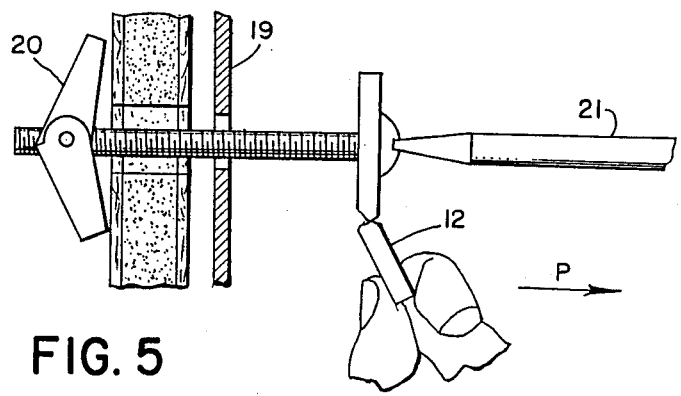
Figure 6:
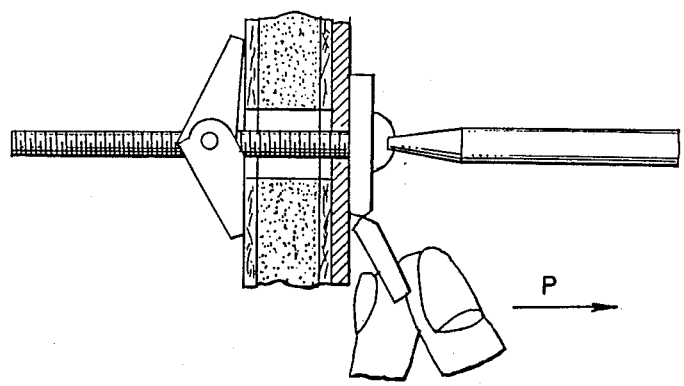

An example of the installation method of the invention is presented in FIGS. 3 to 6. One pulls the wings of a toggle bolt into contact with the inner surface of a wall continuously during tightening of the bolt, this being in contrast with previous practice where the finger nails eventually must be removed, and thus the pulling action eliminated, in order to prevent locking of the fingernails between the wall and bolt head. In this embodiment of the method, the tabbed washer of FIGS. 1 and 2 is used to pull the wings into contact with the wall. In FIG. 3, a toggle bolt 16 is shown being inserted into a wall 18 composed of two cardboard layers separated by a plaster layer. The job involves the mounting of work, here in the form of a medicine cabinet, to the wall; only a portion of the back wall 19 of the cabinet is shown. In FIG. 4, the spring-loaded wings 20 have spread. FIG. 5 shows the thumb and index finger of a carpenter's left hand being used to grasp tab 12 to pull in the direction of arrow P to bring the wings 20 into contact with the inner surface of the wall, while his right hand (not shown) is being used to turn a screwdriver 21 to tighten the bolt. FIG. 6 illustrates how angle A and the length of the tab are dimensioned such that an index finger can remain in place right down to the final tightening of the bolt. Angle A and the length of the tab may be dimensioned, instead, for pulling by pliers, for example long-nose pliers. The invention distinguishes from prior practice where an installer pulls a tabless washer or bolt head with his fingers or fingernails; in such case, the fingers or fingernails must release their hold at the last part of the tightening process and the wings become free to rotate, thereby making the final tightening process difficult. Another previous practice was to pull with a screwdriver or knife blade, but in those cases too, the blade must eventually be removed before the bolt is completely tightened, making the final tightening difficult.

After final tightening, the tab can be snapped off by bending with a pliers.

While the preferred embodiment of the apparatus of the invention provides the washer in the rigid form as is typical of washers, with a tab via which the pull is exerted, in its broader aspect the invention encompasses washers made from flexible plastic, e.g. polyethylene sheet, dimensioned to extend beyond the bolt head sufficiently that it can be grasped for exerting the pull. In the case of flexible plastic, it should be strong enough (via inherent strength or else adequate thickness) that it will not be torn by exertion of pull adequate to prevent turning of the toggle wings on the wall inner surface. Also, the flexible plastic washer need not have a tab; it can simply have an outer diameter extending sufficiently beyond the bolt head that one can grasp and pull on it during the entire tightening process; its flexibility prevents pinching of the carpenter's fingers during the last stages of the tightening. A plastic washer may lay flat, in which case fingernails can be inserted under it to lift its edge to obtain the required grip, or it may be provided with a curl such that its edge naturally protrudes upwards for grasping. A flexible plastic washer may be used in combination with a toroidal (no tab) metal washer, the metal washer providing the rigidity to prevent the bolt head from going into the wall hole (oversized hole to accomodate insertion of the wings), or an oversized bolt head can be used. In another embodiment, a plastic tab can be bonded to a toroidal washer.

While the invention has been illustrated in terms of a toggle bolt having articulated, spring-biased wings, it will be evident that it is as well applicable in the case of toggle bolts of other wing design, such as those where the wings are the two ends of a unitary member which tilts into lock position after insertion, such as exemplified in U.S. Pat. Nos. 4,398,855 and 4,432,683.

Figure 7:
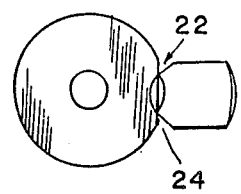
FIG. 7 is a top view, as in FIG. 1, of a modified apparatus of the invention.

FIG. 7 illustrates another embodiment of the washer of the invention, the distinction here being the provision of notches 22 and 24 to facilitate breaking of the tab from the washer. This notching must of course be balanced with the need to provide sufficient strength to withstand the pulling action in the direction of arrow P.

Figure 8:
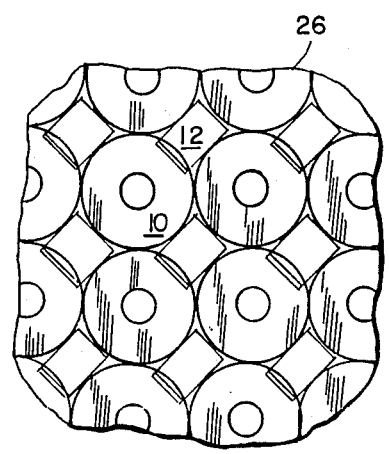
FIG. 8 is a top view of a piece of sheet metal illustrating a manufacturing method of the invention.

FIG. 8 illustrates a manufacturing method of the invention, wherein the washers are stamped from a piece of sheet metal 26 with a layout such that tab 12 of each washer 10 comes from an interstitial region between adjoining, even touching, washers. This means that there is actually no more metal used in manufacturing the tabbed washers of the invention than is ordinarily used to make the usual round washer. While FIG. 8 shows lines indicating that the joint between tab and washer has already been squeezed to provide reduced cross section, such can alternatively be provided after the stamping of the tabbed washers from the sheet metal. Bending at the joint to provide angle A may also be done later.

I claim:

1. In combination with a toggle bolt, a means for exerting a pull on the bolt of the toggle bolt, for maintaining contact of its wings with the inner surface of a wall until the bolt has been tightened, said means comprising a washer dimensioned for permitting exertion of pull at final tightening, said washer being rigid and having an inclined tab, the tab having a joint with the washer of reduced cross section permitting the tab to be broken off.

* * * * *